June 12, 1923.  1,458,563
J. A. WALKER
KNOCKDOWN INTERLOCKING FRAME
Filed April 20, 1922  7 Sheets-Sheet 5

Fig. 5.

J.A.Walker, Inventor

By C. A. Snow & Co.
Attorneys

Patented June 12, 1923.

1,458,563

UNITED STATES PATENT OFFICE.

JAMES A. WALKER, OF LOS ANGELES, CALIFORNIA.

KNOCKDOWN INTERLOCKING FRAME.

Application filed April 20, 1922. Serial No. 555,723.

*To all whom it may concern:*

Be it known that I, JAMES A. WALKER, a citizen of the United States, residing at Los Angeles, in the county of Los Angeles and State of California, have invented a new and useful Knockdown Interlocking Frame, of which the following is a specification.

This invention aims to provide a building which may be erected readily without carpenter work, the frame being interlocking and novel means being provided for connecting the constituent parts thereof to secure the results above mentioned.

It is within the province of the disclosure to improve generally and to enhance the utility of devices of that type to which the invention appertains.

I do not bind myself to the specific details depicted and described, since, within the scope of what is claimed, a mechanic may make changes, without departing from the spirit of the invention or avoiding the charge of infringement.

In the accompanying drawings.

In carrying out the invention, there are provided sills 1 and 2 disposed at right angles to each other, the meeting ends of the sills being beveled as at 3, the sill 2 having at its end an undercut recess 4 defining a shoulder 5, there being an elongated opening 6 in the sill 2, the opening being located in the recess 4, and there being an opening 7 in the sill 2, inwardly of the shoulder 5. The sill 1 has an inwardly projecting rib 80, and is provided on its inner side with an undercut recess 8 forming a shoulder 9, there being an elongated opening 10 in the end of the sill 1, the sill having an opening 11 disposed inwardly of the shoulder 9.

The numeral 12 marks a corner post having a reduced lower end 14 formed by inwardly sloping surfaces 15 and 16, disposed at an angle to each other, the surface 15 defining a transverse shoulder 17, and a slanting surface 16 defining a transverse shoulder 18. The corner post 12 has a longitudinal groove 19 and is provided with a longitudinal groove 20, the grooves 19 and 20 being disposed at right angles to each other. The corner post 12 has a seat 21 in its inner corner. The reduced end 14 of the post 12 is provided with a transverse opening 22 communicating with the groove 19, the post having a transverse opening 23, disposed at right angles to the opening 22 and communicating with the groove 20.

Figure 5:
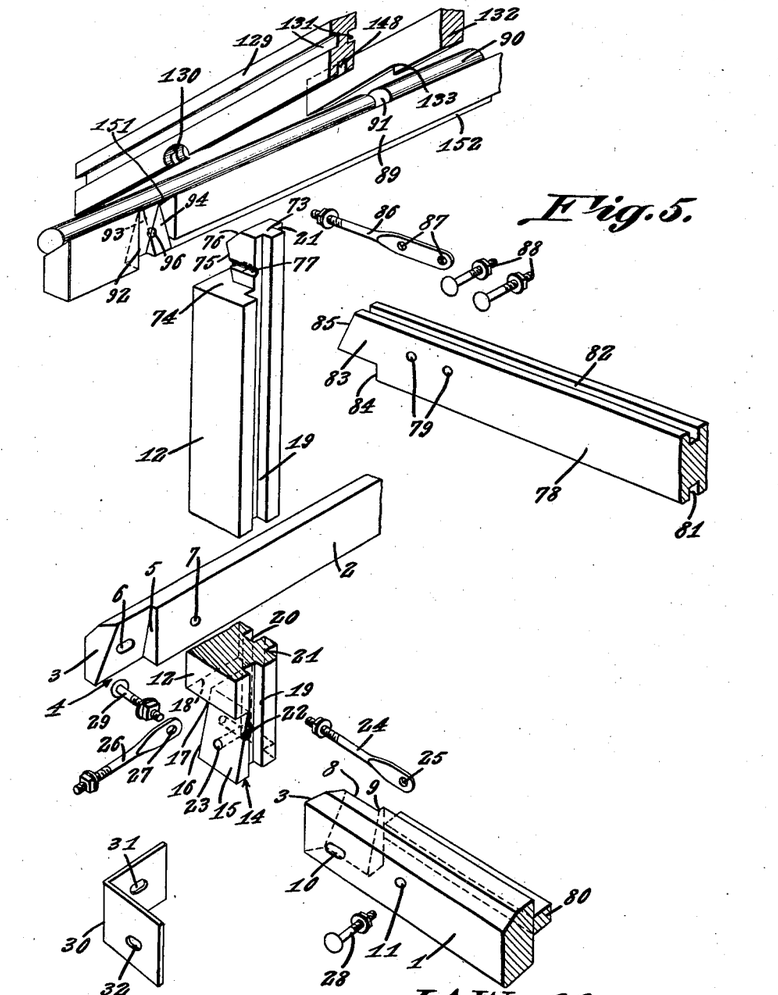
Figure 5 is a composite perspective view wherein certain of the frame parts are shown in spaced relation.

A tightening bolt 24 is provided, and has an opening 25. The numeral 26 designates a tightening bolt having an opening 27. Securing elements 28 and 29, such as bolts, are shown in Figure 5. The numeral 30 marks an angle member having an elongated opening 31 and an elongated opening 32.

Figure 6:
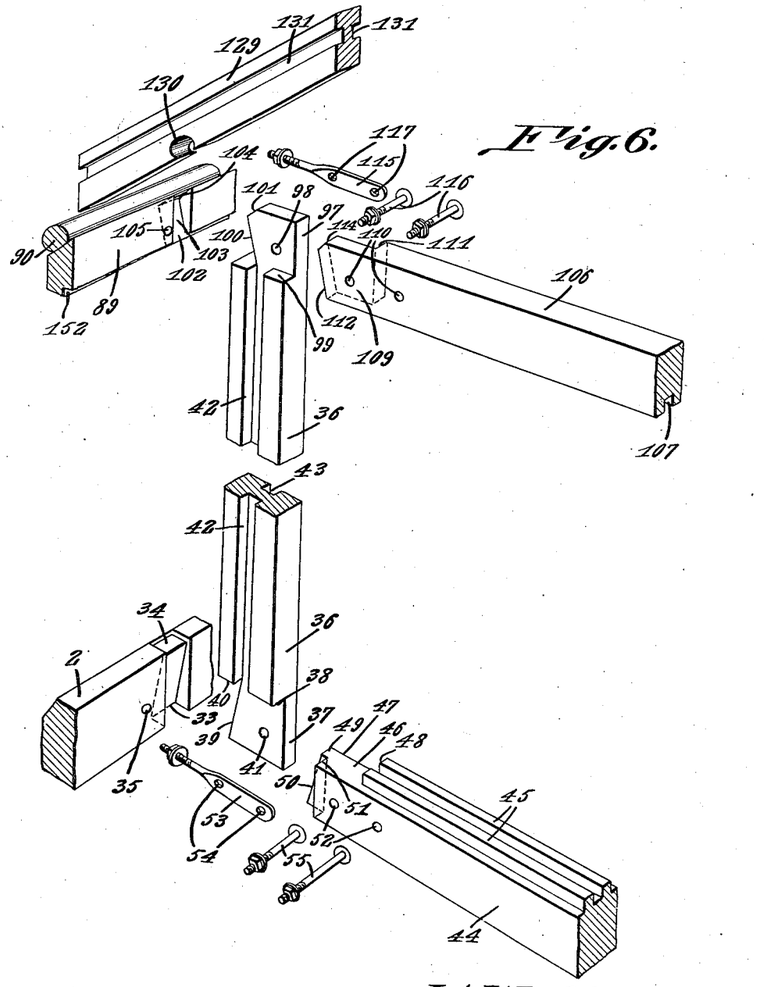
Figure 6 is a composite perspective view wherein other parts of the structure are shown in spaced relation.

The corner post 12 abuts against the shoulder 5 of the sill 2 and against the shoulder 9 of the sill 1, the shoulder 17 on the post 12 resting on the sill 1, and the shoulder 18 of the post resting on the sill 2. The sloping surface 16 of the end 14 of the post 12 cooperates with the sloping wall of the recess 4 in the sill 2, and the sloping surface 15 cooperates with the inclined wall of the recess 8 in the sill 1. The angle member 30 is placed about the joint between the ends of the sills 1 and 2. The bolt 24 is extended through the opening 22 in the end 14 of the post 12, through the opening 6 in the sill 2 and through the opening 31 in the angle member 30, the securing member 28 being extended through the opening 11 in the sill 1 and through the opening 25 in the bolt 24. The bolt 26 is passed through the opening 23 in the end 14 of the post 12, through the opening 10 of the sill 1, and through the opening 32 of the angle member 30. The securing element 29 is mounted in the opening 7 of the sill 2 and in the opening 27 of the bolt 26. If the nuts on the bolts 24 and 26 are tightened, against the angle member 30, the sills 1 and 2, obviously, will be held assembled securely with the lower end of the post 12. Since the openings 10 and 32, on the one hand, and the openings 6 and 31, on the other hand, are elongated, the sills 1 and 2 may be drawn up tightly against the post 12 by the nuts on the bolts 24 and 26, the sill 2 having the necessary movement with respect to the bolt 24 and the sill 1 having the necessary movement with respect to the bolt 26. Noting the lower portion of Figure 6, it will be observed that the sill 2 is provided intermediate its ends with an undercut recess 33, there being a seat 34 in the upper edge of the sill, the seat communicating with the recess. There is an opening 35 in the sill 2, at one side of the recess 33. The numeral 36 marks an intermediate post provided at its lower end with a reduced tongue 37 forming a transverse shoulder 38, the tongue 37 having an inclined edge 39 forming a projection 40 in the post 36, adjacent to the lower end thereof. There is an opening 41 in the tongue 37. The post 36 is provided in its opposite side with grooves 42 and 43. The numeral 44 designates a beam having upstanding ribs 45, the ribs terminating short of one end of the beam, so that a flat surface 46 is afforded at said end of the beam. The beam is cut away to fashion a reduced tongue 47 and a transverse shoulder 48, the shoulder having a projecting lip 49, the outer edge of which is inclined as at 50 the lip forming a shoulder or abutment 51 at the end of the tongue 47. There are openings 52 in the beam 44. The bolt or tightening device 53 is provided, and has openings 54. Securing elements, such as bolts 55 are shown in Figure 6.

The abutment 51 on the beam 44 engages the sill 2, the lip 49 being received in the recess 33, the inclined edge 50 of the lip 49 engaging the sloping wall of the recess 33 in the sill 2. The tongue 37 of the post 36 is received in the recess 33 of the sill 2, the inclined edge 39 of the tongue 37 engaging the sloping wall of the recess 33 in the sill 2. The projection 40 on the post 36 is received in the seat 34 of the sill 2. The shoulder 38 of the post 36 rests on the flat surface 46 of the tongue 47. The tongue 37 on the post 36 extends transversely of the tongue 47 on the beam 44 and abuts against the shoulder 48 on the beam 44. The tightening bolt 53 projects through the opening 35 in the sill 2, the securing elements 55 being mounted in the opening 54 of the bolt 53, and in the openings 52 of the beam 44, one of the securing elements 55 passing not only through the tongue 47 of the beam 44, but, as well, through the opening 41 in the tongue 37 of the post 36, the post being held to the beam 44, and both the beam and the post being drawn tightly into engagement with the sill 2, when the nut on the bolt 53 is tightened.

The numeral 56 designates a floor, which may be reinforced by a beam 58, one end of the floor 56 resting on the beam 44, in abutment with one of the ribs 45 on the said beam, the other end of the floor resting on the rib 80 which projects inwardly from the sill 1. The floor 56 carries depending cleats 57, abutting against the rib 80 and against the beam 44.

Figure 4:
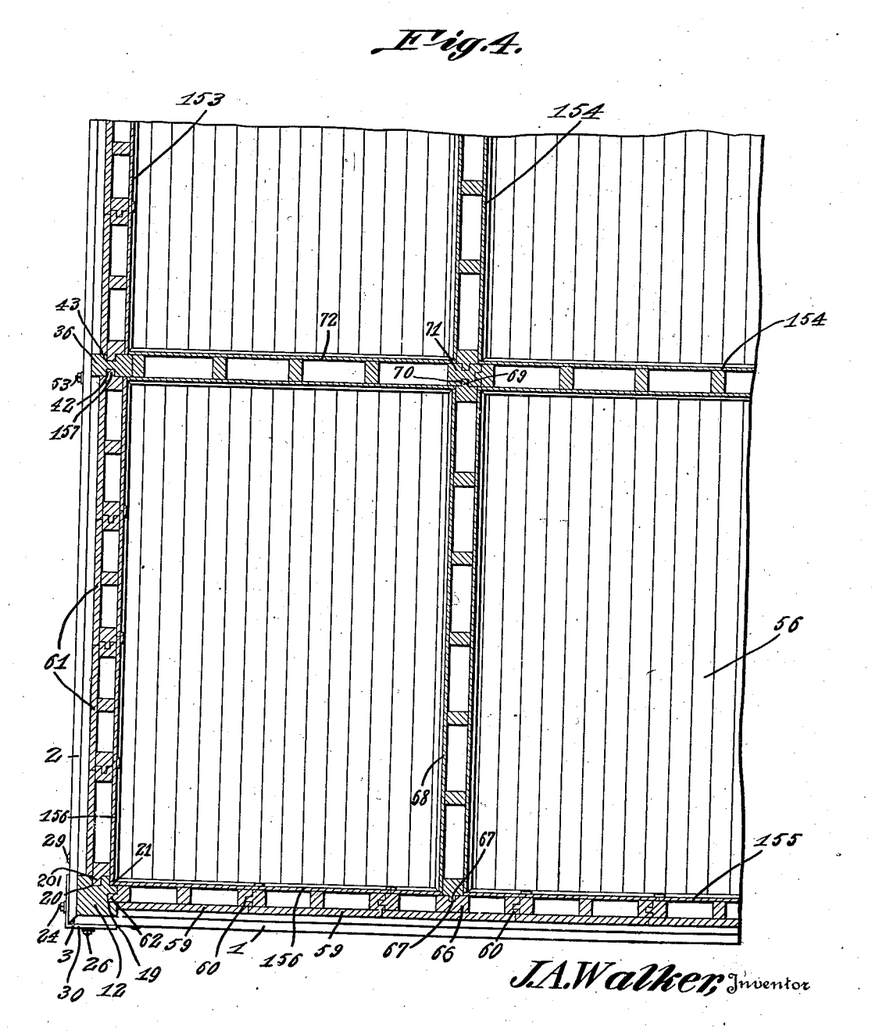
Figure 4 is a section on the line 4—4 of Figure 1.

Wall panels 59 and 61 are provided, the panels 59 being disposed at right angles to the panels 61. At its lower edge, each panel 59 carries an angle bar 64, one flange of which is received between the floor 56 and the sill 1, the other flange of the angle bar overhanging the floor 56. At its upper end, each panel 59 carries a bar 158 provided with an upstanding flange 95. The panels 59 are tongue and grooved together as shown at 60 in Figure 4, so that they may be interengaged with each other, it being possible to use as many of the panels 59 as is desired, depending upon the dimensions of the house. The outermost panel 59 has a flange 62 received in the groove 19 of the post 12. The panels 61 rest on the sill 2 and are constructed like the panels 59, the outermost one of the panels 61 having a flange 201 received in the groove 20 of the post 12. The innermost panel 61 has a flange 157 received in the groove 42 of the post 36. The panels 59 and 61 may include plaster board facings 156, the edges of these facings adjacent to the post 12, being received in the corner seat 21 (Figure 5) of the post, as shown in Figure 4.

One of the panels 59 may include a studding piece 65 having a groove 66 adapted to receive a tongue 67 on a partition 68, the partition being disposed parallel to the panels 61, and being made of studding and plaster board, or in any other suitable way. At its inner end, the partition 68 has a tongue 69 received in a groove 70 formed in a post 71 supported on the beam 44. The partition 72, made of studding and plaster board or equivalent materials, is disposed parallel to the panels 59 and is engaged slidably with the posts 71 and 36. At this point it may be remarked parenthetically that any desired number of panels 155 may be supplied, additional partitions 154 being provided, these partitions being tongue and grooved slidably into the post 71, additional panels 153 being included, the said panels 153 corresponding to the panels 61 and being engaged detachably with the post 36, it being the intention that the building may of course be of any desired size and embody any desired number of rooms.

It appears in Figure 5 that the corner post 12 is equipped at its upper end with a reduced extension 73 defining a ledge 74. The extension 73 has an inwardly sloping surface 75, and is provided thereabove with an upwardly and inwardly sloping surface 76. There is a superficial transverse groove 77 in the extension 73. The numeral 78 designates a joist, having openings 79 and provided in its upper edge with a groove 82.

In the lower edge of the joist 78 there is a groove 81 adapted to receive the upper edge of the partition 72. The joist 78 has a reduced end 83 forming a shoulder 84. The end of the joist 78 is inclined as at 85. The numeral 86 points out a clamp bolt having openings 87. Securing elements 88 are shown in Figure 5.

Figures 7, 8, 9:
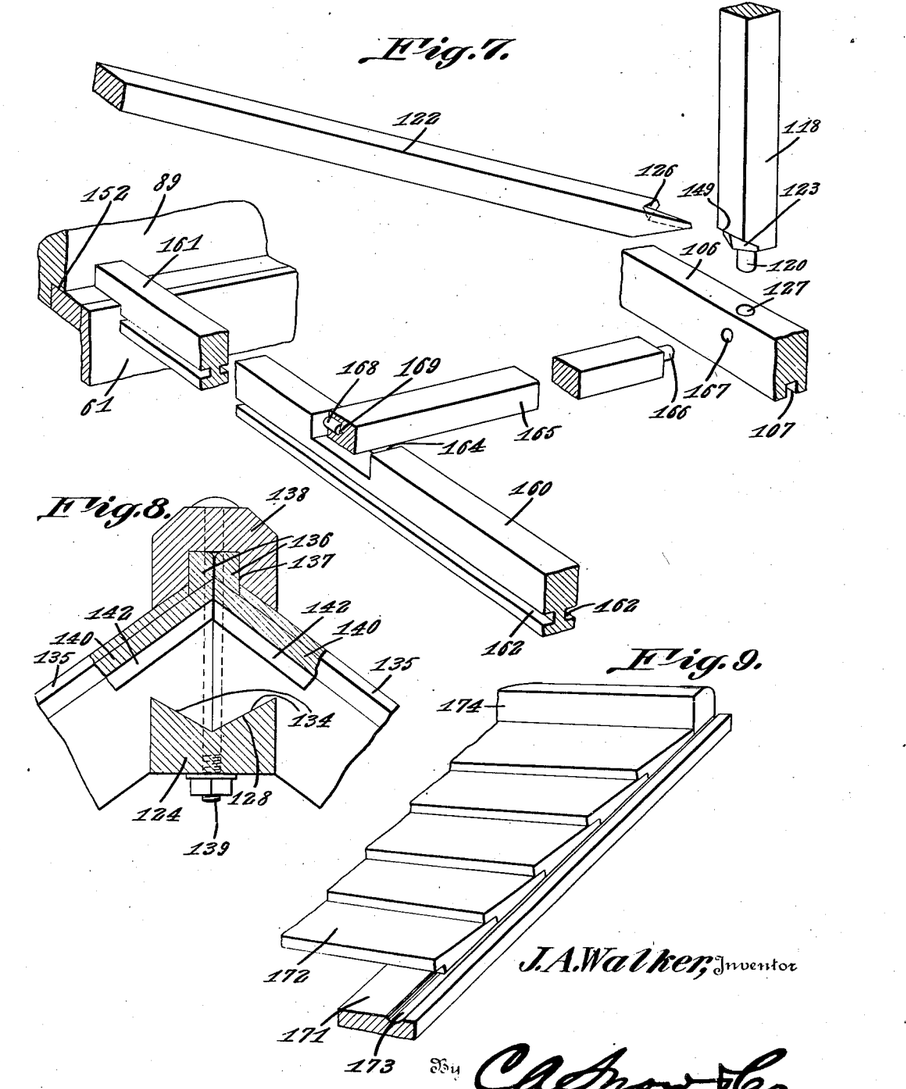
Figure 7 is a composite perspective view showing, in spaced relation, certain parts of the frame which are located adjacent to the top thereof.
Figure 8 is a section on the line 8—8 of Figure 3.
Figure 9 is a perspective view disclosing a slight modification.

A beam 89 is provided, and is supplied in its inner lower edge with a seat 152 (Figure 7). There is a rib 90 on the upper edge of the beam 89, openings 91 being formed in the rib. A recess 92 is fashioned in the beam 89 adjacent to the outer end thereof, the outer wall of the recess being formed by two oppositely sloping surfaces 93 and 94. There is an opening 96 in the beam 89, the opening being located within the recess 92. The rib 90 has a sloping surface 151, indicated in Figure 6. The nature and location of the surface 151 will be understood when a corresponding part 104 in Figure 6 is noted.

The end 83 of the joist 78 rests on the ledge 74 of the post 12, the shoulder 84 abutting against the post. The beam 89 rests on the ledge 74 of the post 12. The inclined surface 75 of the extension 73 cooperates with the inclined surface 94 of the recess 92 in the beam 89. The inclined surface 76 cooperates with the inclined surface 151. The inclined end surface 85 of the joist 78 cooperates with the inclined wall 93 of the recess 92 in the beam 89. The end 83 of the joist 78 abuts laterally against the upstanding extension 73 of the post 12. The bolt 86 extends along the groove 77 in the extension 73 of the post 12 and passes through the opening 96 in the beam 89. The securing elements 88 are mounted in the openings 87 of the clamp bolt 86, and in the openings 79 of the joist 78, the bolt 86 thus being secured to the joist 78. When the nut on the bolt 86 is tightened, the joist 78 and the beam 89 will be held securely together, there being a peculiarly efficient interlocking engagement between the end 83 of the joist 78 and the extension 73 of the post 12, on the one hand, and the beam 89, on the other hand.

Figure 3:
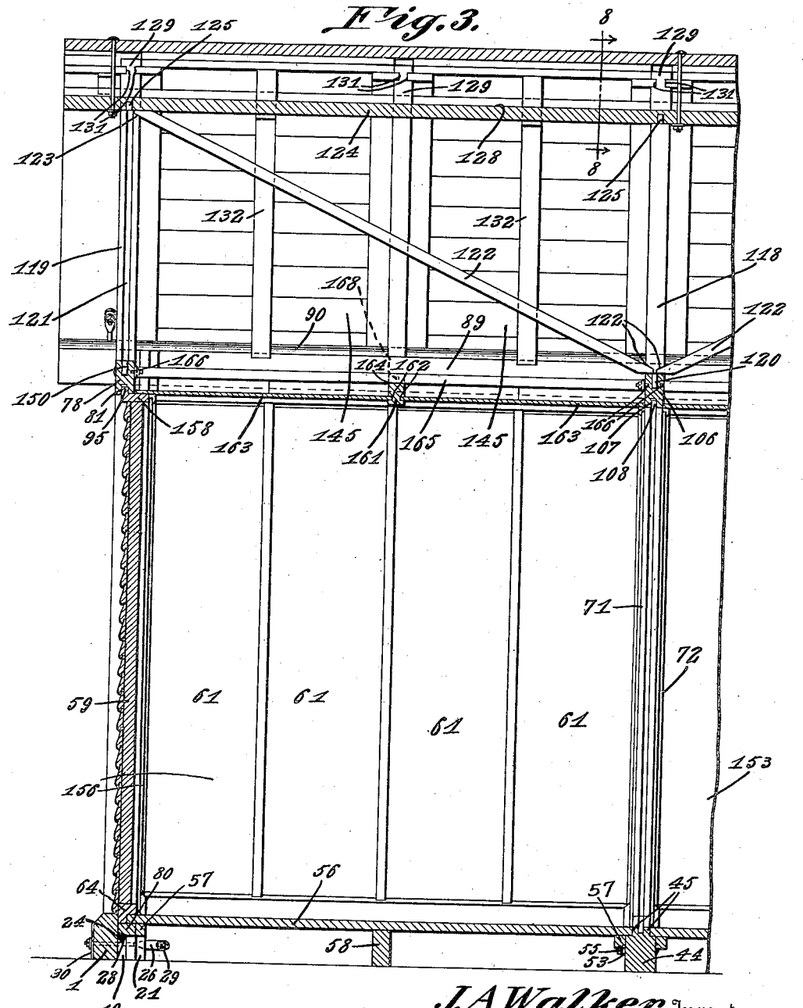
Figure 3 is a section on the line 3—3 of Figure 1.

As shown in Figure 6, the post 36 has a reduced upper end 97 provided with an opening 98 defining a transverse ledge 99, the end 97 having an inwardly and downwardly inclined surface 100, and an upwardly and inwardly inclined surface 101 thereabove. A recess 102 is fashioned in the beam 89 and has an outwardly sloping surface 103. On the under surface of the rib 90 there is a downwardly and outwardly sloping surface 104, hereinbefore mentioned incidentally. An opening 105 is formed in the beam 89 at one side of the recess 102. The numeral 106 marks a cross beam provided in its lower edge with a groove 107 adapted to receive a flange 108 on the partition 72, as shown in Figure 3. The beam 106 has a reduced end 109, defining a transverse shoulder 111, there being openings 110 in the end 109 of the beam 106, and in the body portion thereof. The end 109 of the beam 106 has a downwardly and inwardly inclined surface 112, and an upwardly and inwardly inclined surface 114 thereabove. A clamp bolt 115 is shown and has openings 117. Securing elements 116 appear in Figure 6.

The end 109 of the beam 106 rests on the ledge 99 of the post 36 and abuts horizontally against the end 97 of the post 36, the shoulder 111 of the beam 106 abutting against the reduced end 97 of the post 36, the inclined surface 112 of the end 109 of the beam 106 coinciding with the inclined surface 100 of the end 97 of the post 36, the inclined surfaces 114 and 101 coinciding. The beam 89 is supported on the ledge 99 of the post 36. The extremity of the element 109, and the outer edge of the part 97 are received in the recess 102 of the beam 89, the coacting surfaces 112 and 100 cooperating with the wall 103 of the recess 102, and coacting surfaces 114 and 101 engaging the inclined surface 104 which is beneath the rib 90 on the beam 89. The clamp bolt 115 extends through the opening 105 in the beam 89. The securing elements 116 extend through the openings 117 in the bolt 115, and through the openings 110 in the beam 106 and in the reduced end 109 of the beam. One of the securing elements 116 passes through the opening 98 in the end 97 of the post 36 and, therefore, the beam 106 is bound securely to the post. When the nut on the bolt 115 is seated against the outer surface of the beam 89, the said beam, the member 106 and the post 36 will be united firmly.

Holes 127 (Figure 7) are formed in the beam 106 intermediate the ends thereof. A strut 118 is provided, and has, at its lower end, a pin 120 received in the hole 127. The strut 118 thus is mounted removably on the beam 106. A strut 119 is supported on the joist 78 and is connected thereto by a pin 150 (Figure 3) corresponding to the element 120 of Figure 7. The outer strut 119 is provided in its opposite edges with grooves 121. A diagonal brace 122 is supplied. There is a V-shaped transverse seat 123 at the lower end of the strut 118, the upper end of the strut 119 being equipped with a similar seat. The brace 122 is forked at its ends, as at 126, to straddle the seats 123, and to fit beneath the projections 149 which are formed in the struts 118 and 119, above the seats.

Figure 1:
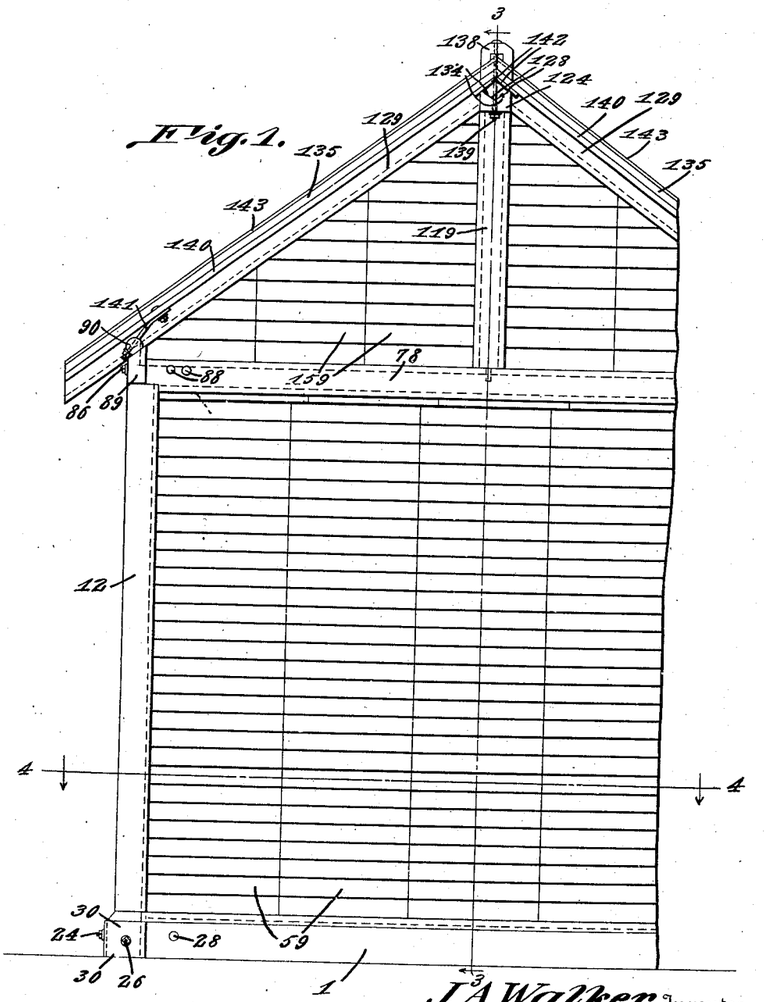
—Figure 1 shows in end elevation, a device constructed in accordance with the invention.
Figure 2:
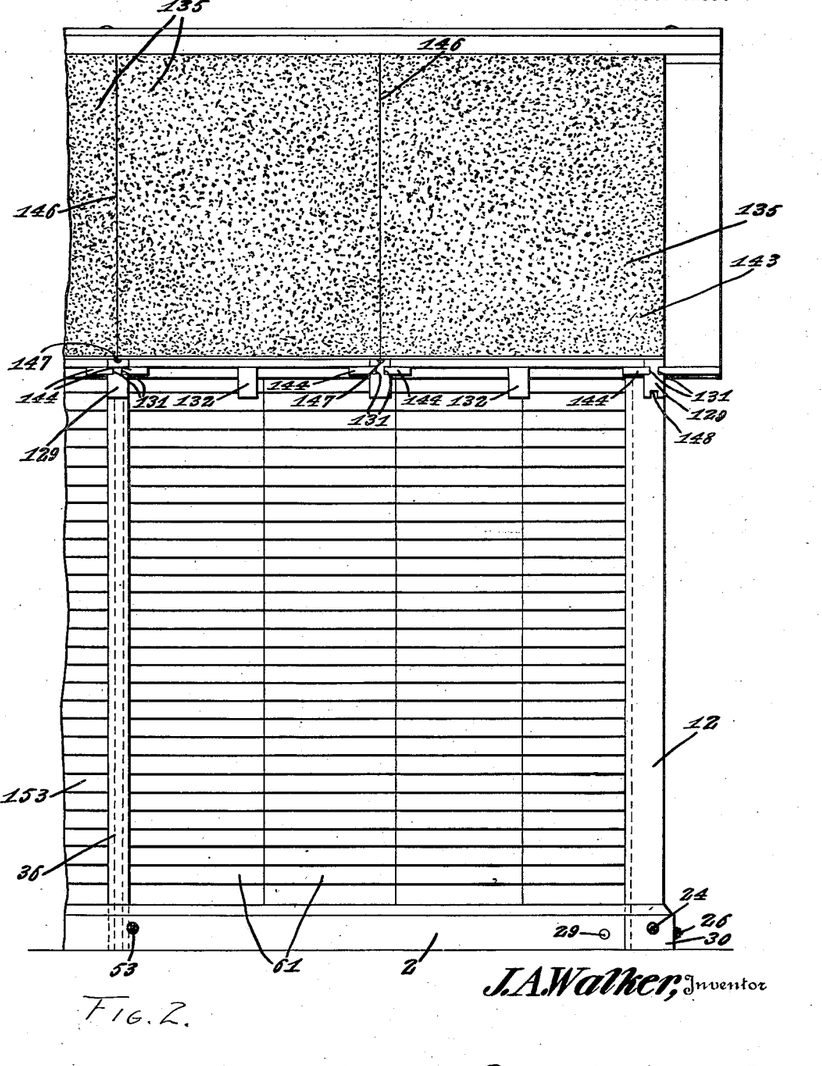
Figure 2 is a side elevation.

A ridge pole 124 is supported on the struts 118 and 119, the ridge pole being connected to the struts by dowel pins 125. The ridge pole 124 is provided in its upper edge with a longitudinal seat 128 (Figure 8), the seat being of V-shape. Rafters 129 are provided, and have notches 130 receiving the rib 90 on the beam 89, the rafters being engaged with the rib by moving the rafters longitudinally of the rib. The upper ends of the rafters 129 meet above the ridge pole 124. The rafters 129 are equipped with side grooves 131. The outermost rafters 129 have bottom grooves 148. As shown in Figure 2, any desired ones of the rafters 129 may be equipped in their upper edges with longitudinal channels 147, permitting the water to drain away from beneath the roof, hereinafter described. Intermediate rafters 132 are shown and rest in the openings 91 of the rib 90 on the beam 89, the said rafters being notched to form stops, which, cooperating with the beam 89, hold the rafters against downward movement. The rafters 132 meet above the ridge pole 124. The rafters 132 and 129 are notched, as shown at 134 in Figure 8, to fit in the longitudinal seat 128 of the ridge pole 124.

Roof sections 135 are provided, the meeting edges of the roof sections, denoted by the numeral 146 being disposed above the channels 147, the channels serving to conduct away water which may leak between the edges 146 of the roof sections. The roof sections may be composed of boards 145 equipped at their edges with cleats 144, received slidably in the grooves 131 of the rafters 129, the boards 145 carrying a cover of tar paper or the like, shown at 143. At their inner edges, the roof sections 135 have upstanding flanges 136 (Figure 8) received in a channel 137 formed in a cap piece 138 mounted on the roof sections and held by securing elements 139 to the ridge pole 124. Finishing boards 140 project outwardly from the outermost rafters 129 and are received in the outer grooves 131 of the said rafters. Bolts 141 are secured to the finishing boards 140 adjacent to their lower ends and are anchored detachably in the ribs 90 of the beams 89. Supporting plates 142 are seated in the upper ends of the outermost rafters 129 and carry the upper ends of the finishing board 140. Triangular panels 159 are shown. The lower edges of the panels 159 are seated in the groove 82 of the joist 78, the inner edges of the panels being seated in the grooves 121 of the strut 119, the upper edges of the panels being received in the bottom grooves 148 of the outermost rafters 129.

Ceiling beams 160 are shown and have reduced ends 161 resting on the members 61, as shown in Figure 7. The ceiling beams 161 have side grooves 162 receiving ceiling plates 163, the outer edges of the ceiling plates resting on the bar 158 of the panel 159, the ceiling plates being supported on a partition 72, it being noted, at this place that, the flange 95 on the plate 158 extends upwardly into the bottom groove 81 of the member 78. Intermediate their ends, the ceiling beams 160 have notches 164, receiving cross members 165 provided with terminal pins 166 entered in openings 167 in the beams 106 and 78. Pins 168 project from the ceiling beams 160 into the notches 164, the notches being of sufficient size so that when the cross members 165 are moved transversely, or when the beams 160 are moved longitudinally, the pins 168 may be received in openings 169 formed in the cross members 165.

Should it be desired to form the roof panels from boards, the structure shown in Figure 9 may be resorted to, the rafter appearing at 171, the boards 172 being secured to the rafters. The rafters have drainage channels 173, as hereinbefore explained, and the flange, corresponding to the part 136 of Figure 8, is denoted by the numeral 174.

What is claimed is:—

1. In a device of the class described, a post having a reduced end defining a shoulder; angularly disposed sills overlapped on said reduced end and engaged beneath the shoulder; and tightening devices on the sills, the tightening devices passing through the post, the tightening device on one sill passing through the other sill.

2. In a device of the class described, a post having a reduced end defining a shoulder; sills disposed at an angle to each other and overlapped on said reduced end, the sills extending beneath the shoulder; an angle member engaged with the sills; and tightening devices on the sills, the tightening devices passing through the angle member, the tightening device on one sill passing through the other sill.

3. In a device of the class described, a post cut away to define a reduced end having inwardly sloping surfaces and to form a shoulder above said surfaces; angularly disposed sills cut away to define reduced ends having inwardly sloping surfaces and to form shoulders at the ends of said surfaces, the reduced ends of the sills being overlapped on the reduced end of the post, and being extended beneath the shoulder on the post, the shoulders on the sills engaging the post, the sloping surfaces on the ends of the sills cooperating with the sloping surfaces on the end of the post; and tightening devices on the sills, both tightening devices passing through the post, the tightening device on one sill cooperating with the other sill.

4. In a device of the class described, a post having a reduced end defining a shoulder; a joist resting on the shoulder, the reduced end of the post, and the joist, having oppositely slanting surfaces; a beam resting on the shoulder and provided with a recess, the rear wall of the recess consisting of oppositely slanting surfaces cooperating with the oppositely slanting surfaces of the reduced end of the post and the joist; and a tightening device connecting the joist with the beam.

5. In a device of the class described, a post having a reduced end defining a shoulder, the reduced end of the post having a downwardly and outwardly slanting surface, and being provided with a downwardly and inwardly slanting surface located therebelow; a joist resting on the shoulder and having a downwardly and outwardly slanting surface; a beam resting on the shoulder and having a recess, the base of the recess comprising oppositely slanting walls, one of said walls cooperating with the downwardly and inwardly slanting surface of the reduced end of the post, and the other of said walls cooperating with the downwardly and outwardly slanting surface of the joist, the beam being provided with an upstanding rib and there being an inclined surface on the beam, beneath the rib, the said inclined surface cooperating with the downwardly and outwardly slanting surface of the reduced end of the post; a roof supporting element interengaged with the rib; and a tightening device connecting the joist and the beam.

6. In a device of the class described, a ridge pole; a beam having a rib; a rafter supported on the ridge pole and having an opening receiving the rib; a roof superposed on the rafter; a cap piece superposed on the roof; and a securing element connecting the cap piece with the ridge pole.

7. In a device of the class described, a beam having a rib, the rib being provided with an opening; a rafter having an opening receiving the rib; a rafter received in the opening of the rib and having a shoulder cooperating with the beam; a ridge pole supporting the rafters; and a roof on the rafters.

8. A device of the class described comprising a beam having a rib, the rib being provided with an opening; a rafter having an opening receiving the rib; a rafter seated in the opening of the rib and having a shoulder engaging the beam; a ridge pole supporting the rafters; a roof on the rafters; a cap piece mounted on the roof; and a securing element connecting the cap piece with the ridge pole.

9. In a device of the class described, a ridge pole having a longitudinal recess; a beam spaced laterally from the ridge pole; rafters having notches receiving the beam, the upper ends of the rafters fitting in the recess; roof sections on the rafters and provided with upstanding flanges; a cap piece fitting over the flanges; and a securing element connecting the cap piece with the ridge pole.

10. In a device of the class described, a rafter having inner and outer grooves; a roof section received in the inner groove; a finishing plate received in the outer groove; a beam carrying the lower end of the rafter; a securing device connecting the finishing plate with the beam; and a supporting element mounted on the rafter adjacent to the upper end thereof and carrying the upper end of the finishing plate.

11. In a device of the class described, spaced struts having seats; a ridge pole supported on the struts; a roof carried by the ridge pole; and a brace extended between the struts, the brace being forked at its ends to cooperate with the seats.

12. In a device of the class described, a supporting means; a ridge pole; a roof carried by the ridge pole; struts extended between the ridge pole and the supporting means, one strut having a seat at its upper end and the other strut having a seat at its lower end; and a brace which is forked at its ends to receive the seats, one end of the brace cooperating with the ridge pole and the other end of the brace cooperating with the supporting means for the last specified strut.

13. In a device of the class described, a wall and a beam disposed approximately at right angles thereto; a ceiling beam disposed approximately parallel to the first specified beam and supported on the wall, the ceiling beam being provided with a notch and having a projection extended into the notch; a ceiling carried by the ceiling beam; a cross member, the cross member being mounted in the notch of the ceiling beam and being movable transversely to engage with the projection of the ceiling beam; and detachably interengaged elements on the cross member and on the first specified beam.

In testimony that I claim the foregoing as my own, I have hereto affixed my signature in the presence of two witnesses.

JAMES A. WALKER.

Witnesses:
HELEN E. SAXTON,
W. A. BAUMGARTEN.